April 27, 1954   J. H. McDANIEL   2,676,498
SAW SETTING IMPLEMENT
Filed April 17, 1953
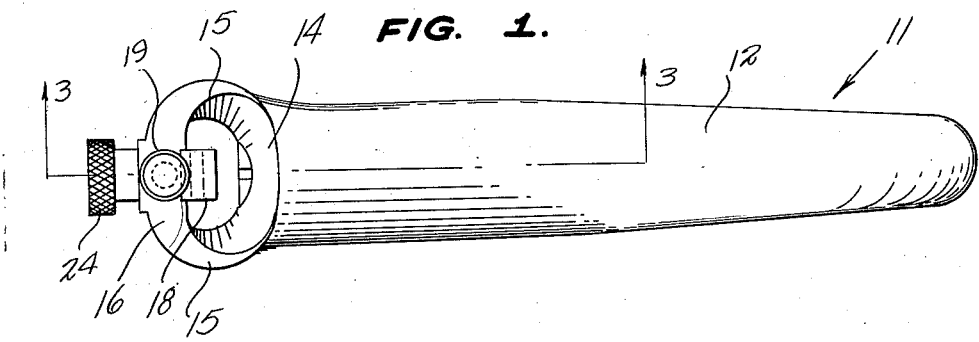
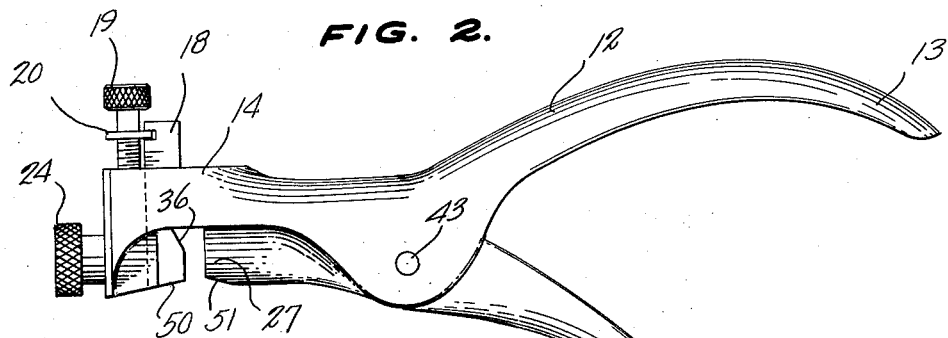
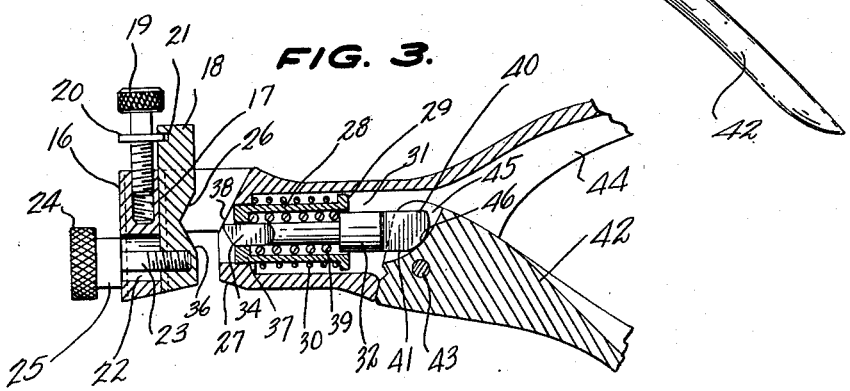
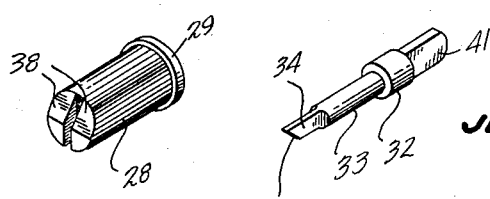 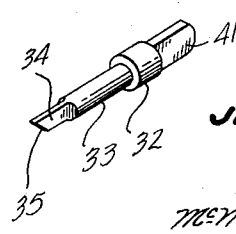
INVENTOR.
JEREMIAH H. McDANIEL,
BY
McMorrow, Berman & Davidson
ATTORNEYS.

Patented Apr. 27, 1954

2,676,498

UNITED STATES PATENT OFFICE 2,676,498

SAW SETTING IMPLEMENT

Jeremiah Hardy McDaniel, Gulfport, Miss.

Application April 17, 1953, Serial No. 349,531

1 Claim. (Cl. 76—69)

This invention relates to devices for setting saw teeth, and more particularly to an improved saw setting, hand operated implement.

A main object of the invention is to provide a novel and improved implement for setting saw teeth, said implement being simple in construction, being easy to operate, and being arranged so that the teeth can be set on a saw even after the saw has been ground down to a relatively small height by a large number of previous saw sharpening and setting operations.

A further object of the invention is to provide an improved implement for setting saw teeth, said implement being inexpensive to manufacture, being rugged in construction, and being effective for use in setting all of the teeth of a saw even after the saw has been worn excessively so that its end has been narrowed to a relatively small width from previous filing of the saw teeth.

Further objects and advantages of the invention will become apparent from the following description and claim, and from the accompanying drawings, wherein:

Figure 1 is a top plan view of an improved hand implement for setting saw teeth constructed in accordance with the present invention.

Figure 2 is a side elevational view of the implement of Figure 1.

Figure 3 is a vertical cross sectional view taken on the line 3—3 of Figure 1.

Figure 4 is a perspective view of the plunger sleeve employed in the implement of Figures 1 to 3.

Figure 5 is a perspective detail view of the inner plunger employed in the implement of Figures 1 to 3.

Referring to the drawings, the saw setting tool is designated generally at 11 and comprises a main frame 12 formed with the rear handle portion 13 and with the forward jaw portion 14. The jaw portion 14 is formed with the side arm elements 15, 15 and the connecting bight portion 16, said bight portion being formed on its inner surface with the vertical groove 17 slidably receiving the vertical anvil member 18. Threadedly engaged in the top portion of the bight element 16 is the adjusting screw 19, said screw being formed with the annular flange 20 which engages in a horizontal groove 21 formed in the upper portion of the anvil member 18, whereby the anvil member may be adjusted vertically by rotating the screw 19. The bight element 16 is formed with the vertical slot 22 through which extends the shank 23 of the locking screw 24, said shank 23 being threadedly engaged in the anvil member 18, whereby the anvil member may be locked in adjusted position by tightening the screw 24. As shown in Figure 3, the screw 24 has the enlarged abutment portion 25 which is adapted to clampingly engage against the vertical outer surface of bight element 16 to provide the necessary clamping force to lock the anvil member 18 in adjusted position.

The anvil member 18 is formed with the usual V-shaped notch 26 which faces the main body of frame 12. Said main body is formed with the transverse shoulder 27 facing the anvil member 18 and defining a transverse slot therewith for receiving a saw blade. Designated at 28 is a longitudinal sleeve which is slidably mounted in the frame adjacent the shoulder 27 for longitudinal movement, the sleeve member 28 being formed with the rear annular rib 29. Designated at 30 is a coiled spring which surrounds the sleeve member 28 and bears between the rib 29 and the forward end of the cavity 31 of frame 12, as shown in Figure 3, biasing the sleeve member 28 rearwardly away from the anvil 18. Designated at 32 is a plunger member slidably mounted in the sleeve for longitudinal movement towards and away from the anvil member 18, the plunger member 32 being formed with the reduced forward shank portion 33 which terminates in the flattened tip 34, said tip having the inclined edge 35 which is substantially parallel to the lower inclined surface 36 of the notch 26 and which is longitudinally aligned therewith, as shown in Figure 3. The forward end wall of the sleeve member 28, shown at 37, is vertically slotted to define a supporting aperture for the flattened tip 34 of plunger 32, and is furthermore formed with the upper inclined surfaces 38, 38 arranged parallel to the upper inclined surface of the anvil notch 26 and longitudinally aligned therewith, as shown in Figure 3.

Surrounding the shank portion 33 of the plunger 32 is the coiled spring 39 which bears between the main body portion of the plunger 32 and the end wall 37 of sleeve 28, biasing the plunger member rearwardly, namely, away from the anvil member 18. The plunger member 32 is formed at its rear end with the flattened vertical lug 40 provided with the arcuately curved camming end edge 41. Designated at 42 is a lever pivoted at 43 to the frame 12, said lever being received in the side flanges 44 of said frame, as shown in Figure 3. The lever 43 is formed at its upper inner corner, as viewed in Figure 3, with the recess 45 having the concavely arcuate camming surface 46 which is cammingly engaged by the curved edge 41 of flattened lug 40.

As will be readily apparent from Figure 3, when the lever 42 is rotated counterclockwise, relative to the pivot 43, as viewed in Figure 3, the camming surface 46 acts against the lug 40 to urge the plunger 32 to the left, as viewed in Figure 3. The saw blade is received in the slot between the shoulder 27 and the anvil member 18, said anvil member being adjusted to provide the desired degree of set to be furnished to the teeth of the saw. It will be further apparent that the implement may be held in one hand and that the lever 42 may be rotated toward the frame 12 by merely squeezing the implement, the plunger member 32 being returned to its rearward position by the action of the springs 30 and 39 when the grip on the implement is relaxed.

It will be noted that the implement may be used on saws which have been narrowed considerably in width by previous filing and that the implement will be effective for setting all of the teeth of such saws, even where the saw blade has been narrowed down to a fraction of an inch in width at its forward end by previous filing and to a relatively small height above the handle at its rear end, for example to a height as little as three-eighths of an inch above the edge of the handle. The implement may be thus employed largely because the slot defined between the shoulder 27 and the anvil member 18 is of relatively short length and is arranged so that a minimum amount of obstruction is present for the positioning of the slot over the saw blade. As is further shown in Figures 2 and 3, the bottom surfaces 50 and 51 of the anvil 18 and the shoulder 27 adjacent the saw blade-receiving slot are inclined upwardly and inwardly to minimize obstructions to the reception of the saw blade into the slot for setting the saw blade teeth.

While a specific embodiment of an improved saw setting tool has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

In a saw setting tool, a frame having an anvil adjustable relative to said frame, a longitudinal sleeve slidably mounted in said frame for longitudinal movement, first spring means biasing said sleeve away from said anvil, a plunger slidably mounted in said sleeve for movement toward said anvil, second spring means biasing said plunger away from said anvil, a lever pivoted to said frame, and a cam element on said lever engaging the end of said plunger and arranged to move said plunger toward said anvil responsive to rotation of the lever toward said frame.

References Cited in the file of this patent

UNITED STATES PATENTS

| Number | Name | Date |
|---|---|---|
| 468,816 | Morrill | Feb. 16, 1892 |
| 616,406 | Cottrell | Dec. 20, 1898 |
| 683,938 | Holt | Oct. 8, 1901 |
| 968,686 | Potter | Aug. 30, 1910 |
| 1,106,829 | Morrill | Aug. 11, 1914 |